United States Patent

[11] 3,611,833

| [72] | Inventor | Jerry F. Baremor<br>Detroit, Mich. |
|---|---|---|
| [21] | Appl. No. | 14,763 |
| [22] | Filed | Feb. 26, 1970 |
| [45] | Patented | Oct. 12, 1971 |
| [73] | Assignee | Eaton Yale & Towne Inc.<br>Cleveland, Ohio<br>Continuation of application Ser. No.<br>705,476, Feb. 14, 1968, now abandoned. |

[54] DIFFERENTIAL
1 Claim, 5 Drawing Figs.

[52] U.S. Cl. .................................................. 74/711, 74/410
[51] Int. Cl. .......................................... F16h 1/44, F16h 57/08
[50] Field of Search ............................................ 74/711, 710, 713, 409, 410

[56] References Cited
UNITED STATES PATENTS

| 1,528,762 | 3/1925 | Goodhart | 74/711 |
| 1,586,861 | 6/1926 | Taylor | 74/711 |
| 2,009,915 | 7/1935 | Davis | 74/711 X |
| 2,283,661 | 5/1942 | Williamson | 74/711 |
| 2,490,146 | 12/1949 | Miller, Jr. | 74/711 |
| 3,052,137 | 9/1962 | Russell | 74/710.5 |

Primary Examiner—Carlton R. Croyle
Assistant Examiner—Thomas C. Perry
Attorney—Yount, Flynn & Tarolli

ABSTRACT: A limited slip differential includes at least a pair of pinion gears having a meshing relationship with a pair of side gears. The meshing relationship of one of the pinion gears with one side gear is out of phase with the meshing relationship of another pinion gear with the one side gear.

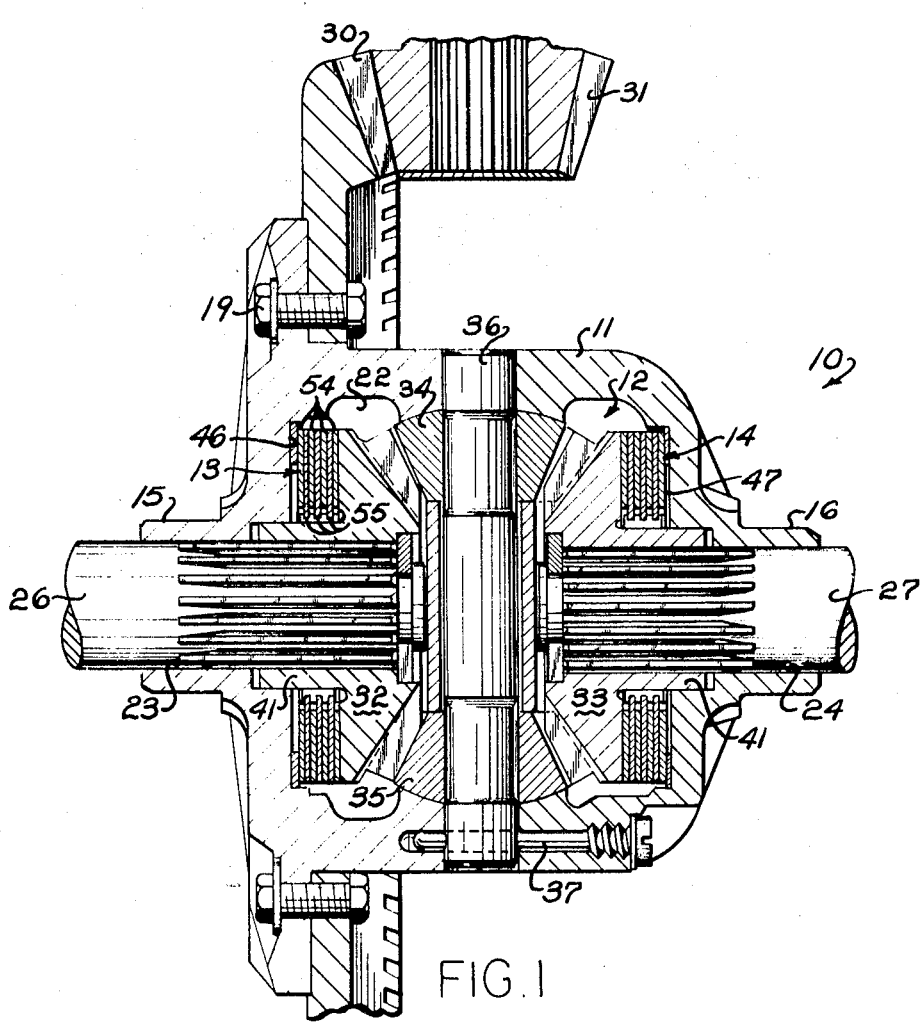
FIG. 1
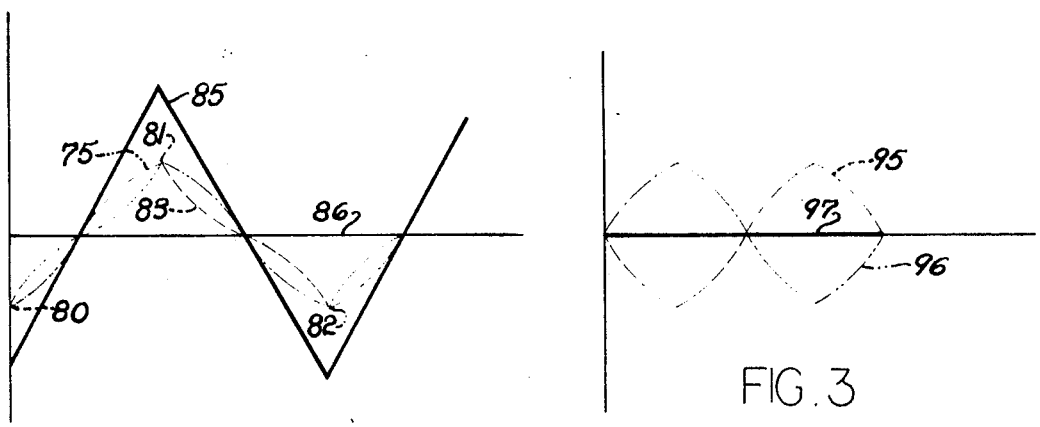
FIG. 2
FIG. 3
INVENTOR.
JERRY F. BAREMOR
BY
Yount, Flynn & Tarolli
ATTORNEYS INVENTOR.
JERRY F. BAREMOR
BY
Yount, Flynn & Tarolli
ATTORNEYS

DIFFERENTIAL

This application is a continuation of application Ser. No. 705,476, filed Feb. 14, 1968, and now abandoned.

The present invention relates to a limited slip differential, and particularly relates to a limited slip differential which includes a differential carrier for a plurality of pinion gears which mesh with side gears, and wherein means is provided acting between at least one side gear and the differential carrier for retarding relative rotation between the side gear and the carrier.

Limited slip differentials for vehicle use are well known and incorporate differential gearing and a clutch mechanism which acts between a side gear of the differential and a differential carrier to retard relative rotation therebetween. Known limited slip differentials experience a torque pulse originating from differential gear reaction when differentiating. This pulse manifests itself in an objectionable phenomenon known as "waddle." The pulse is most prominent at medium to high torque loads. Depending upon the vehicle in which the differential is incorporated and the vehicle's suspension, the pulse can be transmitted throughout the vehicle giving a jerking sensation to the vehicle in a direction normal to the longitudinal axis of the vehicle. Another objectionable result of the pulse is the noise that is sometimes produced thereby.

In the development of limited slip differentials, gear teeth of both the pinions and slide gears with which they mesh have an "octoid" profile, as is known, which approximates involute-shaped gear teeth. As a result, a gear tooth on a pinion is in contact with a gear tooth on the side gear continuously during a predetermined angular amount of rotation of the gears, and the loading of the gear tooth on the side gear by the tooth on the pinion follows a somewhat sinusoidal curve, in that the maximum loading of the side gear tooth occurs when there is full flank contact between the gear tooth on the pinion and the gear tooth on the side gear. During the initial stages of the contact of the gear teeth, the loading of the tooth on the side gear increases along the sinusoidal path to the point of maximum flank contact and decreases from that point to a minimum flank contact and decreases from that point to a minimum loading. Since in prior art limited slip differentials, the gear teeth of all pinions have full flank contact with teeth of the slide gear approximately simultaneously, high tooth loading of the side gear and the aforementioned pulse occurs. Moreover, the pulsing of the side gear is increased due to manufacturing imperfections in the gears.

It has been discovered that by providing an out-of-phase relationship between the meshing teeth of one pinion and side gear and another pinion and the side gear, the tooth loading on the side gear can be timed so that the maximum loading of a gear tooth on the side gear by one pinion does not occur at the same time that the maximum loading of a different side gear tooth by another pinion occurs. As a result, the total load on the side gear at any particular time has a substantially reduced deviation from the average gear load, thus minimizing the gear pulse.

It has been discovered that this timing or phrasing of the meshing relationship between the pinions and a particular side gear can be effected in numerous ways, depending upon the number of pinions and particular location of the pinions with respect to the side gears. In a normal differential unit which involves a pair of side gears, the centers of which are spaced 180° at diametrically opposite locations with respect to the side gears, the phasing of the meshing relationship of each pinion with a side gear can only be effected by providing the side gear with an odd number of teeth. This provides an optimum or approximately 180° phase relationship. In a four-pinion differential unit, the phasing of the meshing relationship of the pinions with a side gear can be accomplished in two different ways. First, if the side gears have an odd number of teeth, then the optimum phase relationship is obtained. This is due to the fact that diametrically opposed pinions on any side gear with an odd number of teeth will have a driving relationship that is 180° out of phase with respect to each other.

Secondly, a phase shift can be accomplished by using four pinions spaced 90° apart if the teeth of the side gear are not a whole number multiple of four, such as 10, 14, and 18, respectively, etc. In effect, any number of differential arrangements can be devised where the pinions are spaced at other than 90° or 180° with respect to each other and different combinations of gear teeth on the side gears can be provided in order to provide a timed, or phased meshing relationship of the gear teeth of the pinions with the gear teeth of the side gears, in order to minimize the compounding of load deviations of the teeth of the side gear by the pinions and, thus, reduce the tendency of pulsing of the side gear and thereby reduce the waddle problem.

Accordingly, the principal object of the present invention is the provision of a new and improved limited slip differential which minimizes the pulse originating from differential gear reaction and as a result, minimizes "waddle" of the vehicle and noise which results as a consequence of such a pulse.

A more specific object of the present invention is the provision of a new and improved differential gear mechanism of the limited-slip type which includes a pair of pinions which have a meshing relationship with a side gear, and wherein the meshing relationship of one pinion with the side gear is out of phase with the meshing relationship of the other pinion with that side gear.

A still further object of the present invention is the provision of a new and improved limited slip differential which includes a plurality of pinions which have a meshing relationship with a side gear of the differential and wherein the meshing gear teeth of the pinions and side gear have a surface configuration which approximates that of an involute surface and wherein the meshing relationships of the gear teeth of one pinion with the side gear are out of phase with the meshing relationship of the gear teeth of the other pinion with that side gear.

Further objects, advantages, and structural features of the present invention will be apparent to those skilled in the art to which it relates from the following detailed description made with reference to the accompanying drawings forming a part of this specification and in which:

FIG. 1 is a sectional view of a limited slip differential embodying the present invention;

FIGS. 2 and 3 are graphs showing characteristics of operation of a limited slip differential of a prior art construction and of the new construction, respectively;

Figure 4:
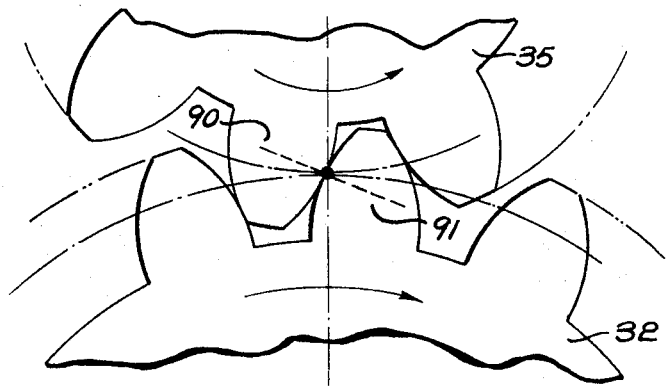
FIG. 4 is a schematic view illustrating the cooperative action between a pair of pinions and a side gear, as embodied in the present invention.
Figure 4:
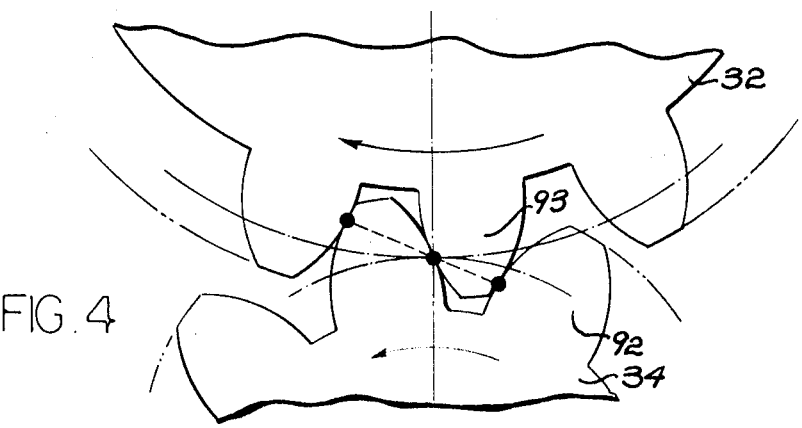

The present invention provides a highly improved differential mechanism of the limited slip type. The differential mechanism of the present invention may be used in a number of different environments, but is particularly adapted for use in an automotive vehicle as the differential thereof. In general, the differential mechanism includes a differential carrier, a plurality of pinion gears carried by the differential carrier, and side gears which mesh with the pinions and deliver torque to an output member. The differential is of an improved construction in that the pinions have an out-of-phase relationship with the side gears so as to minimize any pulse on the side gears originating from differential gear reaction and thereby minimize the problem of "waddle" which has plagued the performance of limited slip differentials.

As representative of a preferred embodiment of the present invention, FIG. 1 illustrates a differential mechanism 10. The differential mechanism 10 comprises, in general, a rotatable differential carrier 11, a differential gear train 12, and friction clutch means 13, 14 associated with gears of the differential gear train for retarding relative rotation of those gears and the carrier 11 for minimizing traction wheel slippage, as is well known.

The carrier 11 is provided with support portions or journals 15, 16 adapted to be received in bearings of a supporting structure, such as an axle housing not shown, by which the carrier 11 is rotatably supported. The carrier 11 is hollow and defines a gear chamber 22 in which the gear train 12 and the friction clutch means 13, 14 are located.

The carrier 11 is provided with openings 23, 24 extending through portions thereof in which the journals 15, 16 are formed and which openings are disposed in aligned relation on a common axis which is also the rotational axis of the carrier 11. The axial openings 23, 24 receive or accommodate the driven or power output shafts 26, 27, respectively, whose outer ends are connected with traction wheels, or the like, not shown, and whose inner or adjacent ends are connected with the gear train 12, as will be explained hereinafter.

The differential mechanism 10 also includes the conventional ring gear 30 extending around and mounted on the carrier 11 by means of connecting bolts 19. A drive pinion 31 is here shown in mesh with the ring gear 30 and represents the power input means of the differential mechanism 10.

The gear train 12 comprises, in the preferred embodiment, a pair of bevel-type side gears 32, 33 and a group of bevel-type idler or pinion gears 34, 35 disposed between and in meshed engagement with the side gears 32, 33. The pinions 34, 35 are rotatably supported in the carrier 11 as by means of a pinion shaft 36 extending across the gear chamber 22 and secured in the carrier by a suitable anchor pin 37 extending through the pinion shaft transversely thereof.

The side gears 32, 33 each comprise an annular body having the gear teeth formed thereon and a central hollow sleeve or hub portion 41 connected with the body and extending coaxially with the rotational axis 25. The side gears 32, 33 are provided with splines in the hub openings thereof and which are engaged by corresponding splines formed on the inner ends of the axial shafts 26, 27 for connecting such shafts with the side gears.

The carrier 11 is provided with annular thrust portions 46, 47 which are here represented as being flat end wall surfaces formed on the carrier 11. These annular thrust portions 46, 47 receive or absorb the outward axial thrust of the side gears 32, 33 which results from the pressure angle torque load reaction of the meshed teeth of the gear train 12. The friction clutch means 13, 14 cooperate with the side gears 32, 33, respectively, to retard relative rotation between the respective side gears and the differential carrier. Due to the operation of the clutch means 13, 14, unequal torques can be applied to the shafts 26, 27 providing the limited slip action which is well known.

Each of the friction clutch means 13, 14 is of substantially identical construction and, therefore, only the friction clutch means 13 will be described in detail. The friction clutch means 13 is a pressure-responsive clutch means of a suitable type and is located between the annular thrust portion 46 of the carrier 11 and the side gear 32, respectively, so that limited outward axial loading of the side gear 32 in response to the above-noted pressure angle torque load reaction from the meshed teeth of the gear train 12 will cause the clutch 13 to be actuated to an energized condition. The clutch 13 is here shown as being a disk-type friction clutch having a first group of friction disks or plates 54 and a second group of such disks or plates 55 which are interleaved between the disks of the first group.

The clutch disks 54 are connected with the carrier 11 by having a suitable driving connection therewith, such as a spline connection, not shown. The clutch disks 55 are connected with the hub 41 of the side gear 32. For this purpose, the hub 41 is provided with an annular group of splines extending axially therealong and the associated clutch disks 55 have radial teeth engaged with the splines. The spline connections of the clutch disks 55 and the hub 41 and the connection of the clutch disks 54 with the carrier 11 permit sufficient axial shifting or loading of the clutch disk in response to the limited outward axial movement or loading of the side gear 32 to produce the above-mentioned engaged or energized condition of the clutch. The differential 10, insofar as the above is concerned, is of a generally conventional construction and operation, and reference may be made to U.S. Pat. No. 3,052,137 for a more detailed description thereof.

Figure 5:
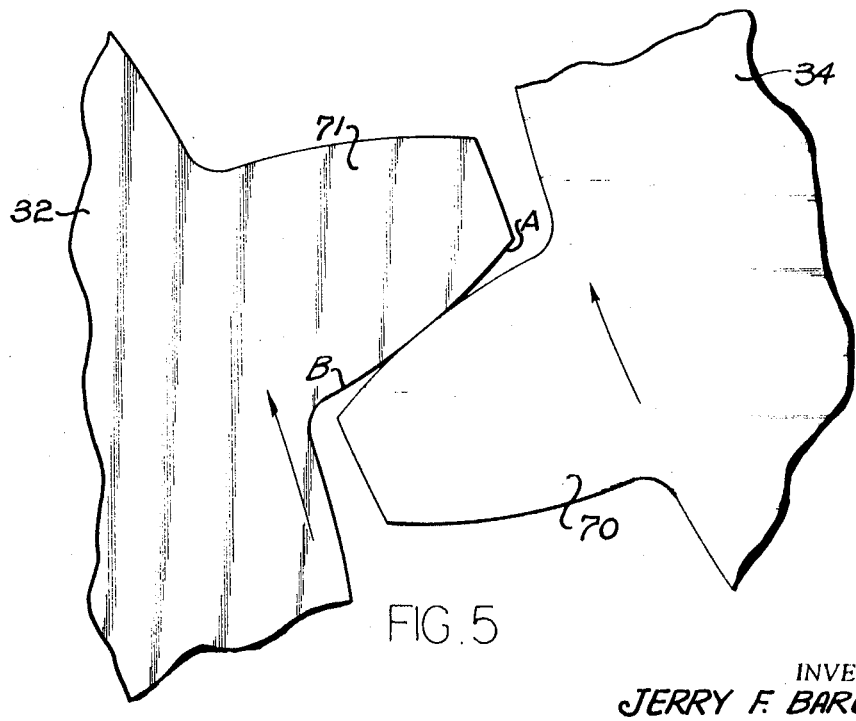
FIG. 5 is an enlarged fragmentary view of approximately involute-type gear teeth in meshing relationship.

The tooth profiles of the side gears 32, 33 and also of the pinion gears 34, 35 are of conventional form, namely, these gears have an approximate involute tooth profile. As shown somewhat schematically in FIG. 5, the pinion gear 34 is illustrated in mesh with the side gear 32, and specifically, a gear tooth 70 on the pinion 34 is shown in mesh with a gear tooth 71 on the side gear 32. The profiles of the teeth 70, 71 are of an "octoid" or generally involute shape, and as a result, the surfaces of gear teeth 70, 71 are in continuous contact from a point where the initial contact of the gear teeth occurs, such as designated A, to a point, such as designated B, as the gear teeth rotate. Moreover, the forces acting on the side gear 32 due to the driving relationship of the pinion 34 therewith are substantially sinusoidal, in that when the tooth 70 initially engages the tooth 71, such as at point A, the forces acting on the gear tooth 71 as applied by the gear tooth 70 is at a minimum and increases approximately sinusoidally to a maximum when the gear teeth 70, 71 are in full flank meshing relationship, illustrated in FIG. 5, and then decreases sinusoidally as the contact of the teeth 70, 71 approaches the final point of contact designated B.

The gear tooth loading of the teeth of a side gear of the prior art which results in "waddle" can be more readily understood upon reference to FIG. 2 which illustrates in dot-dash lines the sinusoidal curve 75 of the loading of a gear tooth, such as the gear tooth 71 of the side gear 32, during contact with a tooth, such as the tooth 70 of the pinion 34. At point 80 on the curve 75, the loading is indicated to be a minimum, which would correspond with the point A of initial contact of a gear tooth of the pinion and a gear tooth of the side gear. As the contact of the gear teeth of the pinion and side gear moves along the surface of the gear teeth, as described hereinabove, the loading of the gear tooth on the side gear increases to a maximum at point 81, and then decreases to point 82, which would correspond with the last point of contact between the gear teeth.

The teeth of a second pinion, such as pinion 35, simultaneously and in phase with the teeth of the first pinion, mesh with the side gear. The second pinion, such as pinion 35, however, meshes with a tooth of the side gear which is diametrically opposite a tooth in mesh with the first pinion. The curve of the loading of the side gear during a tooth cycle with the second pinion is designated 83 in FIG. 2, and shown by dashed lines. As a result of the simultaneous meshing relationships between the first and second pinions with diametrically opposed teeth on the side gear, the total loading of the side gear is double that illustrated in FIG. 2. The resultant curve is as indicated in heavy lines designated 85 in FIG. 2. It should be readily apparent that when there is full flank contact between a gear tooth on the first pinion and a gear tooth on the side gear 32, there is a corresponding full flank contact between a gear tooth on the second pinion, and a gear tooth of the side gear 32. This provides a high peak of gear tooth loading of the side gear, even though the average loading, designated by the line 86, is relatively low.

It is known that such high gear tooth loading results in a pulse which is transmitted to the automotive vehicle in which the limited slip differential is utilized and which results in the aforementioned problem of waddle and noise. The waddle problem is unique with limited slip differentials and occurs when the differential is differentiating. This is due to the fact that a limited slip differential is capable of transmitting unequal torques to the output shafts by means of load-sensitive clutches.

In accordance with the present invention, the above-noted high peak 85 of gear tooth loading has been eliminated without changing the average gear tooth loading as represented by line 86 and without otherwise affecting the operation of the limited slip differential 10. This has been effected in accordance with the present invention by effecting the meshing relationship of the teeth of one pinion with a particular side gear in an out-of-phase relationship with the meshing relationship of the teeth of another pinion gear with that same side gear. As a result, at least two pinions which have a meshing relationship with a side gear are out of phase in their meshing relationship and do not, therefore, have teeth which initially contact teeth on the side gear at precisely the same time and do not have their maximum gear tooth loading occuring at the same time. As a result, the peak of gear tooth loading, such as 85 designated in FIG. 2, has been eliminated, as will be apparent from the description hereinbelow.

The out-of-phase meshing relationship between a pair of pinions and a side gear can be effected in a number of different ways, depending upon the number of pinions and the particular location of the pinions with respect to the side gear. In the differential 10 which includes the pair of pinions 34, 35 which mesh with the side gears 32, 33 and wherein the pinions are spaced approximately 180° apart, and, therefore, the meshing relationship between the pinions and side gears occurs at diametrically opposite locations, the out-of-phase meshing relationship can be effected in a very simple manner. The out-of-phase meshing relationship is effected by providing the side gears 32, 33 with an odd number of teeth. As a result, every tooth of the side gear has a space diametrically opposite it and, when one tooth of the side gear is in full flank meshing relationship with a tooth on one pinion, another tooth on the side gear is merely initially engaging a tooth on the other pinion.

This should be more apparent upon reference to FIG. 4. The pinion 34 has 10 gear teeth thereon, the side gear 32 having 17 gear teeth thereon, and the pinion 35 having 10 gear teeth thereon. Not all of the teeth of the gears are illustrated for purposes of clarity. Since the side gear 32 has an odd number of teeth thereon, the meshing relationship between the pinion 34 and the side gear 32 is out of phase with the meshing relationship of the pinion 35 and the side gear 32. As shown in FIG. 4, the pinion 35 has a substantially full flank contact between the tooth 90 thereof and the tooth 91 of the side gear 32. On the other hand, it should also be apparent that the tooth 92 of the pinion 34 and the tooth 93 of the side gear have just initially contacted each other. As a result, loading of the teeth of the side gear 32 is phased and the maximum gear tooth loading on the side gear 32 is minimized. This can be appreciated more readily upon reference to FIG. 3 which illustrates, in the line designated 95, the gear tooth loading between the pinion 34 and the side gear 32, and in the line designated 96, the tooth loading due to the meshing relationship of the pinion 35 and the side gear 32. It should be apparent that both curves 95, 96 are sinusoidal curves which are 180° out of phase. As a result, the theoretical average loading of the side gear 32 is substantially a horizontal line designated 97. This average is the same as the average loading of the prior art, designated 86 in FIG. 2. However, the side gear pulsing is substantially reduced and the problems of "waddle" and noise, aforementioned, are substantially reduced. The above description of the out-of-phase meshing relationship of the pinions 34, 35 with the side gear 32 is equally applicable to the side gear 33 and will, therefore, not be repeated.

The curves shown in FIGS. 2 and 3 are somewhat idealized for illustrative purposes, but do closely approximate actual operating conditions in a differential. These curves would vary due to manufacturing imperfections in the gears, lubricant conditions, etc.

In other differentials, the principle of the present invention may be equally applied. In the case of a four-pinion differential, the phasing of the meshing relationship to reduce pulse loading of the side gear can be effected between any pair of the four pinions. Moreover, all four pinions can have a phased meshing relationship so as to minimize the maximum loading on the side gears. This phasing can be accomplished in two different ways. First, if the side gears have an odd number of teeth, then the optimum phase relationship is always obtained. This is due to the fact that diametrically opposed pinions on any side gear with an odd number of teeth will have a driving relationship that is 180° out of phase with respect to each other. Secondly, the phasing in a differential incorporating four pinions spaced 90° can be effected, if the number of teeth on the side gears is not a whole multiple of four, such as 10, 14, 18, etc. In this case, the diametrically opposed pinions will be in phase with each other, and 180° out of phase with the pinions located 90° away from them.

In view of the foregoing, it should be apparent that applicant has provided a new and improved limited slip differential mechanism which has greatly eliminated the problem of "waddle." Moreover, it should be apparent that certain modifications, changes, and adaptations may be made in the invention by those skilled in the art to which it relates, and it is intended to cover all such modifications, adaptations, and changes which come within the scope of the appended claims.

I now claim:

1. A limited slip differential gear mechanism comprising a rotatable differential carrier, a plurality of pinion gears carried by said differential carrier and rotatable about their own axes relative to said differential carrier, a pair of side gears in continuous meshing engagement with said pinion gears, said side gears and pinion gears having gear teeth with a tooth profile which approximates an involute curve, at least a pair of said pinion gears being mounted at diametrically opposite locations relative to said side gears, friction clutch means operatively associated with at least one of said side gears and said differential carrier for retarding relative rotation between said one side gear and said differential carrier, and each of said side gears having an odd number of teeth thereon providing an out-of-phase continuous meshing relationship of said pair of pinion gears with said side gears to thereby tend to provide a relatively uniform transmission of force between said side gears and said pinion gears upon relative rotation between said one side gear and said differential carrier against the influence of said friction clutch means.